US012322011B2

United States Patent
Nitzan et al.

(10) Patent No.: US 12,322,011 B2
(45) Date of Patent: Jun. 3, 2025

(54) PRODUCT OF VARIATIONS IN IMAGE GENERATIVE MODELS

(71) Applicant: ADOBE INC., San Jose, CA (US)

(72) Inventors: Yotam Nitzan, Tel-Aviv (IL); Taesung Park, San Francisco, CA (US); Michaël Gharbi, San Francisco, CA (US); Richard Zhang, Burlingame, CA (US); Junyan Zhu, Pittsburgh, PA (US); Elya Shechtman, Seattle, WA (US)

(73) Assignee: ADOBE INC., San Jose, CA (US)

( * ) Notice: Subject to any disclaimer, the term of this patent is extended or adjusted under 35 U.S.C. 154(b) by 176 days.

(21) Appl. No.: 18/056,579

(22) Filed: Nov. 17, 2022

(65) Prior Publication Data

US 2024/0169621 A1 May 23, 2024

(51) Int. Cl.
*G06T 11/60* (2006.01)
*G06V 10/774* (2022.01)
*G06V 10/82* (2022.01)

(52) U.S. Cl.
CPC ............ *G06T 11/60* (2013.01); *G06V 10/774* (2022.01); *G06T 2200/24* (2013.01); *G06V 10/82* (2022.01)

(58) Field of Classification Search
CPC ... G06T 11/60; G06T 2200/24; G06V 10/774; G06V 10/82
See application file for complete search history.

(56) References Cited

U.S. PATENT DOCUMENTS

2020/0167914 A1* 5/2020 Stamatoyannopoulos ................. G16B 40/30
2022/0084271 A1* 3/2022 Shen ....................... G06T 11/40
2023/0377368 A1* 11/2023 Cheng ................... G06V 40/171

OTHER PUBLICATIONS

Ran Gal, et al., "StyleGAN-NADA: CLIP-Guided Domain Adaptation of Image Generators," ACM Transactions on Graphicsvol. 41Issue Jul. 4, 2022 Article No. 141pp. 1-13.

(Continued)

*Primary Examiner* — Said Broome
*Assistant Examiner* — Andrew Shin
(74) *Attorney, Agent, or Firm* — F. CHAU & ASSOCIATES, LLC

(57) ABSTRACT

Systems and methods for image generation include obtaining an input image and an attribute value representing an attribute of the input image to be modified; computing a modified latent vector for the input image by applying the attribute value to a basis vector corresponding to the attribute in a latent space of an image generation network; and generating a modified image based on the modified latent vector using the image generation network, wherein the modified image includes the attribute based on the attribute value.

12 Claims, 11 Drawing Sheets

(56) References Cited

OTHER PUBLICATIONS

Elad Richardson, et al. "Encoding in Style: StyleGAN Encoder for Image-to-Image Translation." Proceedings of the IEEE/CVF Conference on Computer Vision and Pattern Recognition (CVPR), 2021, pp. 2287-2296.
Ian J. Goodfellow, et al., "Generative Adversarial Nets," Communications of the ACM vol. 63 Issue 11 Nov. 2020 pp. 139-144.
Hoang Thanh-Tung, et al. "Catastrophic forgetting and mode collapse in GANs." 2020 International Joint Conference on Neural Networks (IJCNN), Proceedings of the IEEE, Sep. 28, 2020.
Mikolay Binkowski, et al., "Demystifying MMD GANS," Published as a conference paper at ICLR 2018, Mar. 21, 2018.
Amit H. Germano, et al., "State-of-the-Art in the Architecture, Methods and Applications of StyleGAN," Computer Graphics Forum, vol. 41, Issue2, May 2022, pp. 591-611.

\* cited by examiner

PRODUCT OF VARIATIONS IN IMAGE GENERATIVE MODELS

TECHNICAL FIELD

Embodiments of the present disclosure are directed to the use of machine learning to transform and generate digital images.

DISCUSSION OF THE RELATED ART

A variety machine learning models may be used to transform and generate digital images, including generative adversarial networks (GANs), diffusion models and variational auto encoders (VAEs). GANs, in particular, are a group of artificial neural networks where two neural networks are trained based on an adversarial relationship with each other. GANs may be used in conjunction with supervised learning, semi-supervised learning, unsupervised learning, and reinforcement learning.

GANs may be used for semantic editing in a process that can be described as "project and edit". First, an image is projected into the latent space of a GAN. Next, the projected latent code is manipulated to represent a semantically meaningful change. Then the GAN may generate an image based on the manipulated latent code. Various methods have been proposed to discover semantic manipulations in the latent space of GANs.

SUMMARY

Embodiments of the disclosure relate to systems and methods for generating images using a machine learning model. In some embodiments, a model is trained to generate images based on a latent space in which one or more basis vectors of an orthogonal basis represent specific semantic categories. Accordingly, users can identify a parameter corresponding to a particular characteristic and make continuous adjustments to increase or decrease the presence of the selected characteristic, and a latent vector representing the image can be modified by applying a different weight to the corresponding basis vector.

One or more embodiments of a method, apparatus, and non-transitory computer readable medium include obtaining an input image and an attribute value representing an attribute of the input image to be modified; computing a modified latent vector for the input image by applying the attribute value to a basis vector corresponding to the attribute in a latent space of an image generation network; and generating a modified image based on the modified latent vector using the image generation network, wherein the modified image includes the attribute based on the attribute value.

One or more embodiments of a method, apparatus, and non-transitory computer readable medium include initializing parameters of an image generation network; identifying a target value for a target attribute; computing an edit latent vector by applying the target value to a basis vector of a latent space of an image generation network; generating an edit output image based on the edit latent vector; computing an edit loss function based on the edit output image; and training the image generation network to depict the target attribute by updating the parameters based on the edit loss function.

One or more embodiments of an apparatus and method include one or more processors; one or more memories including instructions executable by the one or more processors to; obtaining an input image and an attribute value representing an attribute of the input image; computing a modified latent vector for the input image by applying the attribute value to a basis vector corresponding to the attribute in a latent space of an image generation network; and generating a modified image based on the modified latent vector using the image generation network, wherein the modified image includes the attribute based on the attribute value.

DETAILED DESCRIPTION

The present disclosure relates to generating images using a machine learning model. Embodiments of the disclosure include training a dedicated neural network for each new data domain while trying to preserve high-level knowledge from the original data domain. Conventional methods for generating modified images may entail storing a dedicated neural network for each data domain, which is expensive in terms of data storage, and have difficulty generalizing to new domains.

Embodiments of the disclosure provide a method for fine-tuning a generative model that preserves the original knowledge and explicitly represents new knowledge along predetermined linear directions in the latent space. Accordingly, a single neural network may be used to generate modify images with multiple semantic parameters. Furthermore the network may be updated to enable different modifications with minimal retraining. Example embodiments are able to encode 80 or more different domains without degrading the performance of the generative model.

In some examples, a latent space is decomposed into dedicated regions representing distinct hyperplanes, each of which are represents a different objective or semantic characteristic. In addition, embodiments of the disclosure allocate a dedicated region to maintain the original behavior, thus preventing a generative model from forgetting representations included in the original training set during fine-tuning.

Methods according to embodiments expand the capacity of a given generative model to include additional knowledge that corresponds to additional data domains that were not included in the original training set, without forgetting the previously learned knowledge. In addition, both old and new knowledge are represented in a semantically meaningful manner.

Forgetting is a challenge in machined learning (ML), and it was not initially clear that a single model can "expand" to have new knowledge without forgetting previous, especially at scale. To represent the "new knowledge/domains", methods according to embodiments obtain quality that is at least equivalent to a model trained using a text-supervised training method. Methods according to an embodiment can preserve the quality and diversity of the original knowledge domain.

Details regarding the architecture of an example image generation system are provided with reference to FIGS. 1-3 and 10. Details regarding the process of image generation are provided with reference to FIGS. 4-6. Example training processes are described with reference to FIGS. 7-8, 9A and 9B.

Network Architecture

Figure 1:
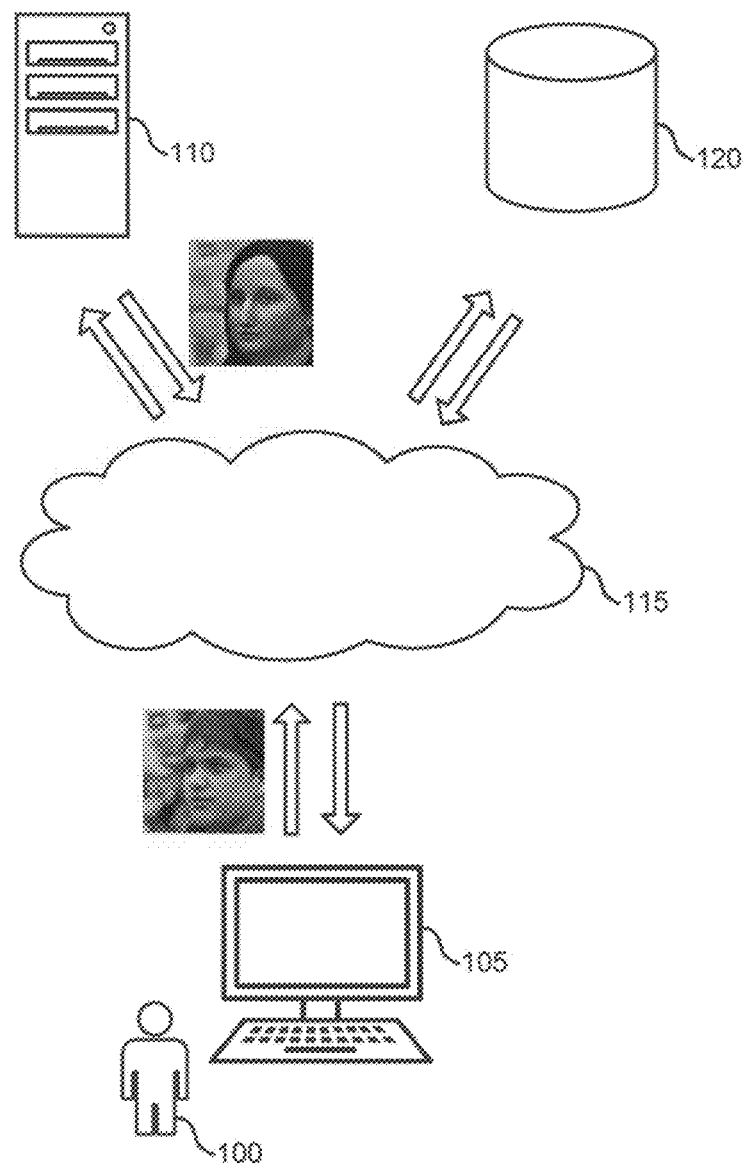
FIG. 1 illustrates an image generation system according to embodiments of the present disclosure.
Figure 2:
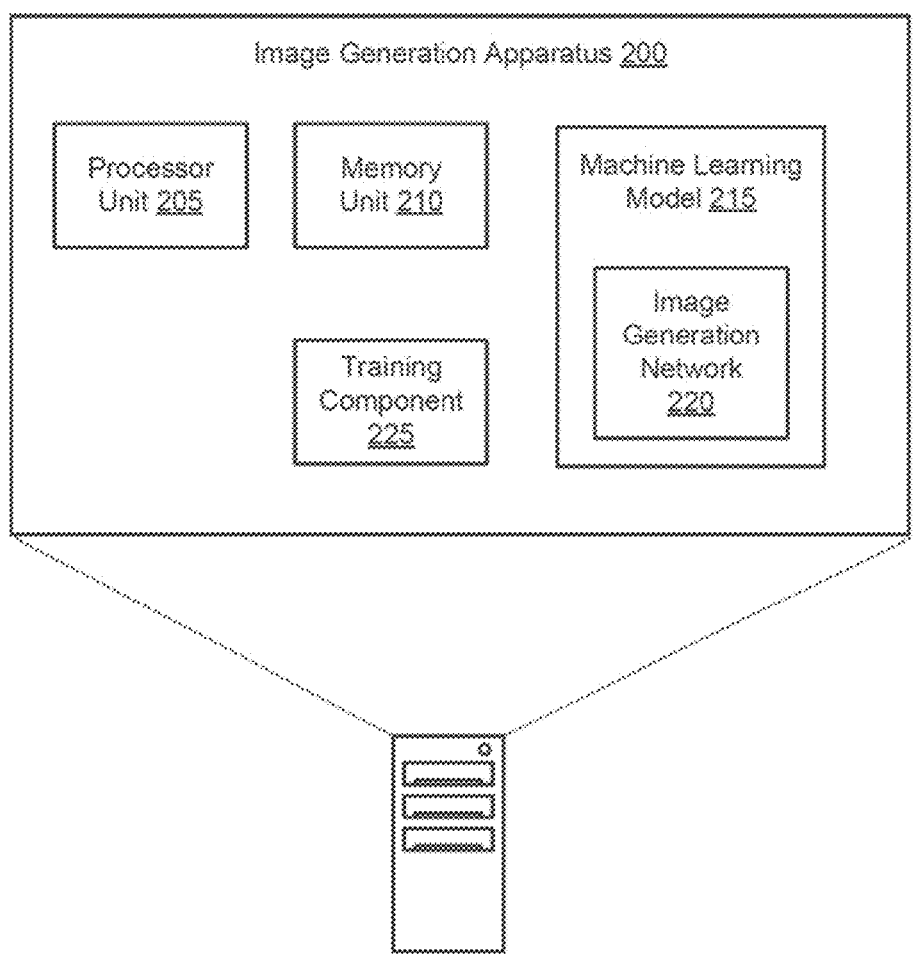
FIG. 2 illustrates an image generation apparatus according to embodiments of the present disclosure.
Figure 3:
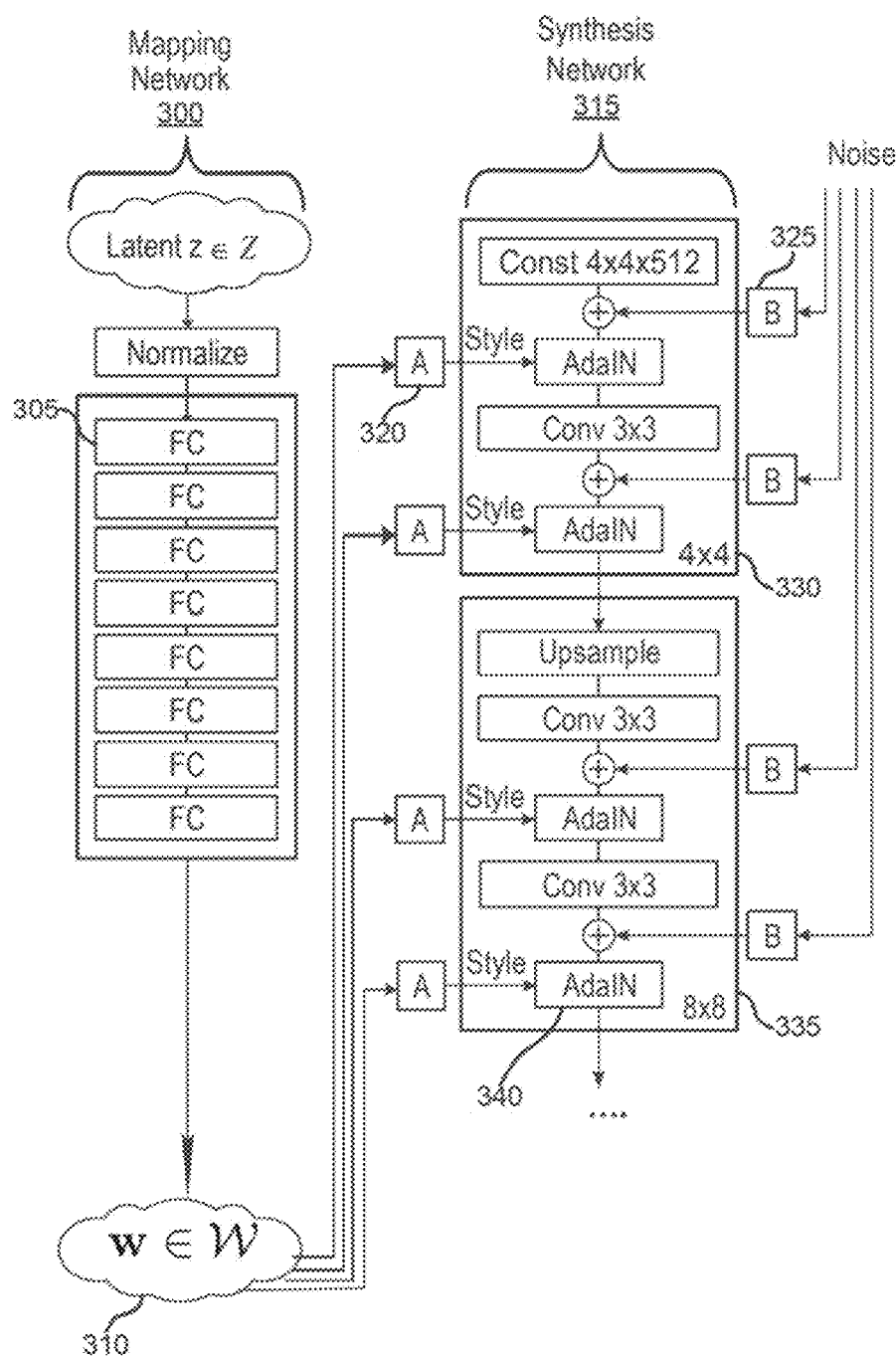
FIG. 3 illustrates a style-based generator according to embodiments of the present disclosure.

In FIGS. 1-3, an apparatus and method for image generation are described. One or more embodiments of the apparatus include one or more processors; one or more memories including instructions executable by the one or more processors to: obtaining an input image and an attribute value representing an attribute of the input image; computing a modified latent vector for the input image by applying the attribute value to a basis vector corresponding to the attribute in a latent space of an image generation network; and generating a modified image based on the modified latent vector using the image generation network, wherein the modified image includes the attribute based on the attribute value.

In some embodiments, the image generation network comprises a generative adversarial network (GAN). In some embodiments, the image generation network comprises a variational auto-encoder (VAE). In some embodiments, the image generation network is trained for a first image generation task and fine-tuned to depict the attribute. In some embodiments, the instructions are further executable to train the image generation network to depict the attribute based on an edit loss function and a baseline loss function.

FIG. 1 illustrates an image generation system according to embodiments of the present disclosure. The example shown includes user 100, user device 105, image generation apparatus 110, cloud 115, and database 120. Image generation apparatus 110 is an example of, or includes embodiments of, the corresponding element described with reference to FIG. 2.

In an example shown in FIG. 1, user 100 provides an input image. The document is transmitted to the image generation apparatus 110, e.g., via user device 105 and cloud 115. The image generation apparatus 110 generates a new image that synthesizes attributes received from user input with the original input image, so that an output image combines feature from the original input image with the user attributes, as will be described below. For example, a user can provide an image and modify a slider representing a parameter such as "Mona Lisa Style" and an output image can be generated that is consistent with the selected parameter.

User device 105 may be a personal computer, laptop computer, mainframe computer, palmtop computer, personal assistant, mobile device, or any other suitable processing apparatus. In some embodiments, user device 105 includes software that incorporates an image generation application.

In some embodiments, the image generation application on user device 105 may include functions of image generation apparatus 110.

A user interface may enable user 100 to interact with user device 105. In some embodiments, the user interface may include an audio device, such as an external speaker system, an external display device such as a display screen, or an input device, such as a remote control device interfaced with the user interface directly or through an I/O controller module. In some cases, a user interface may be a graphical user interface (GUI). In some embodiments, a user interface may be represented in code which is sent to the user device and rendered locally by a browser. In some embodiments, user interface is an example of, or includes embodiments of, the corresponding element described with reference to FIG. 10.

Image generation apparatus 110 includes a computer implemented network that includes a machine learning model and an image generation network. Image generation apparatus 110 may also include a processor unit, a memory unit, an I/O module, and a training component. The training component is used to train a machine learning model, such as an image generation network or a classifier. In addition, image generation apparatus 110 can communicate with database 120 via cloud 115. In some cases, the architecture of the image generation network is also referred to as a network or a network model. Further detail regarding the architecture of image generation apparatus 110 is provided with reference to FIGS. 2-3 and 10. Further detail regarding the operation of image generation apparatus 110 is provided with reference to FIGS. 4 and 6.

In some embodiments, image generation apparatus 110 is implemented on a server. A server provides one or more functions to users linked by way of one or more of the various networks. In some cases, the server includes a single microprocessor board, which includes a microprocessor responsible for controlling all embodiments of the server. In some cases, a server uses on or more microprocessors and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files, such as for displaying web pages. In various embodiments, a server comprises a general-purpose computing device, a personal computer, a laptop computer, a mainframe computer, a supercomputer, or any other suitable processing apparatus.

Cloud 115 is a computer network that provides on-demand availability of computer system resources, such as data storage and computing power. In some embodiments, cloud 115 provides resources without active management by the user. The term cloud is sometimes used to describe data centers available to many users over the Internet. Some large cloud networks have functions distributed over multiple locations from central servers. A server is designated an edge server if the server has a direct or close connection to a user. In some cases, cloud 115 is limited to a single organization. In other embodiments, cloud 115 is available to many organizations. In one embodiment, cloud 115 includes a multi-layer communications network comprising multiple edge routers and core routers. In another embodiment, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 illustrates an image generation apparatus 200 according to embodiments of the present disclosure. The example shown includes image generation apparatus 200, processor unit 205, memory unit 210, machine learning model 215, and training component 225. In some embodiments, the machine learning model 215 includes image generation network 220. Image generation apparatus 200 is an example of, or includes embodiments of, the corresponding element described with reference to FIG. 1.

Processor unit 205 is an intelligent hardware device, such as a general-purpose processing component, a digital signal processor (DSP), a central processing unit (CPU), a graphics processing unit (GPU), a microcontroller, an application-specific integrated circuit (ASIC), a field programmable gate array (FPGA), a programmable logic device, a discrete gate or transistor logic component, a discrete hardware component, or any combination thereof. In some embodiments, processor unit 205 operates a memory array using a memory controller. In other cases, a memory controller is integrated into the processor. In some embodiments, processor unit 205 executes computer-readable instructions stored in a memory to perform various functions. In some embodiments, processor unit 205 includes special-purpose components for modem processing, baseband processing, digital signal processing, or transmission processing. According to some embodiments, processor unit 205 includes one or more processors.

Examples of memory unit 210 include random access memory (RAM), read-only memory (ROM), or a hard disk. Examples of memory unit 210 include solid-state memory and a hard disk drive. In some embodiments, memory unit 210 is used to store computer-readable, computer-executable software including instructions that, when executed, cause a processor to perform various functions described herein. In some embodiments, memory unit 210 contains, among other things, a basic input/output system (BIOS) that controls basic hardware or software operation such as the interaction with peripheral components or devices. In some embodiments, a memory controller operates memory cells. For example, the memory controller can include a row decoder, column decoder, or both. In some embodiments, memory cells within memory unit 210 store information in the form of a logical state.

According to some embodiments of the present disclosure, image generation apparatus 200 includes a computer-implemented artificial neural network (ANN) that generates classification data for a set of samples. An ANN is a hardware or a software component that includes a number of connected nodes (i.e., artificial neurons), which loosely correspond to the neurons in a human brain. Each connection, or edge, transmits a signal from one node to another, like the physical synapses in a brain. When a node receives a signal, the node processes the signal and then transmits the processed signal to other connected nodes. In some embodiments, the signals between nodes comprise real numbers, and the output of each node is computed by a function of the sum of its inputs. Each node and edge is associated with one or more node weights that determine how the signal is processed and transmitted.

According to some embodiments, training component 225 computes an edit loss function based on the edit output image. In some embodiments, training component 225 trains the image generation network 220 to depict the target attribute by updating the parameters based on the edit loss function. In some embodiments, the edit loss function trains the image generation network 220 to generate images having the target attribute. In some embodiments, training component 225 computes a baseline loss function based on the baseline output image, where the parameters of the image generation network 220 are updated based on the baseline loss function. In some embodiments, the baseline loss function prevents the image generation network 220 from forgetting a previously trained image generation task.

The term "forget" can refer to a model that has become unable to perform a previously trained task. For example, a generative model may forget to generate images represented in the original training set after the generative model was fined-tuned on a new domain.

According to some embodiments, training component 225 pre-trains the image generation network 220 to generate images prior to training the image generation network 220 to depict the target attribute. In some embodiments, training component 225 computes an additional edit loss function based on the additional edit output image. In some embodiments, training component 225 trains the image generation network 220 to depict the additional target attribute by updating the parameters based on the additional edit loss function. In some embodiments, training component 225 trains the image generation network 220 to depict each of a set of attributes based on values of a set of basis vectors, respectively.

According to some embodiments, training component 225 trains the image generation network 220 to depict the attribute based on an edit loss function and a baseline loss function.

According to some embodiments, machine learning model 215 includes image generation network 220. In one embodiment, machine learning model 215 obtains an input image and an attribute value that represents an attribute of the input image to be modified. In some embodiments, machine learning model 215 receives a user input via a user interface that includes an attribute control element for the attribute, where the user input indicates the attribute value.

According to some embodiments, machine learning model 215 obtains an input image and an attribute value representing an attribute of the input image.

According to some embodiments, image generation network 220 computes a modified latent vector for the input image by applying the attribute value to a basis vector that corresponds to the attribute in a latent space of an image generation network 220. In some embodiments, image generation network 220 generates a modified image based on the modified latent vector using the image generation network 220, where the modified image includes the attribute based on the attribute value. In some embodiments, image generation network 220 projects the input image into the latent space to obtain an input latent vector. In some embodiments, image generation network 220 computes a representation of the input latent vector in an orthogonal basis that includes the basis vector, where the modified latent vector is based on the input latent vector.

According to some embodiments, the modified image retains a set of attributes from the input image other than the attribute. In some embodiments, image generation network 220 obtains an additional attribute value that represents an additional attribute of the input image to be modified. In some embodiments, image generation network 220 computes an additional latent vector based on the additional attribute value by applying the additional attribute value to an additional basis vector that corresponds to the additional attribute in the latent space of the image generation network 220. In some embodiments, image generation network 220 generates an additional image based on the additional latent vector by using the image generation network 220.

According to some embodiments, image generation network 220 initializes parameters of the training component 225. In some embodiments, image generation network 220 identifies a target value for a target attribute. In some embodiments, image generation network 220 computes an edit latent vector by applying the target value to a basis vector of a latent space of an image generation network 220. In some embodiments, image generation network 220 generates an edit output image based on the edit latent vector.

In some embodiments, image generation network 220 identifies a baseline latent vector that is independent of the target value. In some embodiments, image generation network 220 generates a baseline output image based on the baseline latent vector. In some embodiments, image generation network 220 samples an initial latent vector from the latent space, where the edit latent vector and the baseline latent vector are based on the initial latent vector.

In some embodiments, image generation network 220 identifies an orthogonal basis for the latent space. In some embodiments, image generation network 220 selects the basis vector to correspond to the target attribute. In some embodiments, image generation network 220 samples a set of latent vectors in the latent space. In some embodiments, image generation network 220 performs a principal component analysis (PCA) based on the set of latent vectors, where the orthogonal basis and the basis vector are based on the PCA. In other examples, methods other than PCA can be used to identify basis vectors for the latent space. In some cases, the basis vectors are selected so that modifying a latent vector along the direction of the basis vector will not degrade the performance of the generative model (i.e., especially if the generative model is over-parameterized).

In some embodiments, image generation network 220 identifies an additional target value for an additional target attribute. In some embodiments, image generation network 220 computes an additional edit latent vector by applying the target value to an additional basis vector of the latent space. In some embodiments, image generation network 220 generates an additional edit output image based on the additional edit latent vector. In some embodiments, image generation network 220 identifies a set of attributes for fine-tuning the image generation network 220. In some embodiments, image generation network 220 identifies a set of basis vectors of the latent space corresponding to the set of attributes, respectively.

According to some embodiments, image generation network 220 computes a modified latent vector for the input image by applying the attribute value to a basis vector that corresponds to the attribute in a latent space of an image generation network. In some embodiments, image generation network 220 generates a modified image based on the modified latent vector using the image generation network, where the modified image includes the attribute based on the attribute value.

In some embodiments, the image generation network 220 includes a generative adversarial network (GAN). In some embodiments, the image generation network 220 includes a variational auto-encoder (VAE). In some embodiments, the image generation network 220 is trained for a first image generation task and fine-tuned to depict the attribute.

The described methods may be implemented or performed by devices that include a general-purpose processor, a digital signal processor (DSP), an application-specific integrated circuit (ASIC), a field programmable gate array (FPGA) or other programmable logic devices, discrete gate or transistor logic, discrete hardware components, or any combination thereof. A general-purpose processor may be a microprocessor, a conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration. Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media include both non-transitory computer storage media and communication media that include any medium that facilitates the transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

In addition, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 illustrates a style-based generator according to embodiments of the present disclosure. The example shown includes mapping network 300, fully-connected layers 305, intermediate latent space 310, synthesis network 315, learned affine transform 320, learned per-channel scaling factors 325, first convolutional layer 330, second convolutional layer 335, and adaptive instance normalization 340.

Generative adversarial networks (GANs) are a group of artificial neural networks where two neural networks are trained based on an adversarial relationship with each other. Given a training set, the network learns to generate new data with similar properties as the training set. For example, a GAN trained on photographs can generate new images that look authentic to a human observer. GANs may be used in conjunction with supervised learning, semi-supervised learning, unsupervised learning, and reinforcement learning. In some embodiments, a GAN includes a generator network and a discriminator network. The generator network generates candidates while the discriminator network evaluates the generated candidates. The generator network learns to map from a latent space to a data distribution of interest, while the discriminator network distinguishes candidates produced by the generator from the true data distribution.

The generator network's training objective is to increase the error rate of the discriminator network, i.e., to produce novel candidates that the discriminator network classifies as real.

According to some embodiments, the example style-based generator is style generative adversarial networks (StyleGAN). StyleGAN is an extension to the GAN architecture that uses an alternative generator network that includes using a mapping network 300 to map points in latent space to an intermediate latent space 310, using an intermediate latent space 310 to control style at each point, and introducing noise as a source of variation at each point in the generator network.

According some embodiments, the mapping network 300 performs a reduced encoding of the original input and the synthesis network 315 generates, from the reduced encoding, a representation of the original input.

According to some embodiments, the mapping network 300 includes a deep learning neural network comprised of fully connected (FC) layers 305. In some cases, the mapping network 300 takes a randomly sampled point from the latent space, such as intermediate latent space 310, as input and generates a style vector as output.

According to some embodiments, the synthesis network 315 includes a first convolutional layer 330 and a second convolutional layer 335. For example, the first convolutional layer 330 includes convolutional layers, such as a conv 3×3, adaptive instance normalization (AdaIN) layers, such as adaptive instance normalization 340, or a constant, such as a 4×4×512 constant value. For example, the second convolutional layer includes an upsampling layer (e.g., upsample), convolutional layers (e.g., conv 3×3), or adaptive instance normalization (AdaIN) layers, such as adaptive instance normalization 340.

According to some embodiments, the synthesis network 315 takes a constant value, for example, a constant 4×4×512 constant value, as input to start the image synthesis process. The style vector generated from the mapping network 300 is transformed by learned affine transform 320 and is incorporated into each block of the synthesis network 315 after the convolutional layers (e.g., conv 3×3) via the AdaIN operation. In some cases, the adaptive instance normalization 340 layers can perform the AdaIn operation. The AdaIN layers first standardizes the output of feature map so that the latent space maps to features in a way so that a randomly selected feature map will result in features that are distributed with a Gaussian distribution, then add the style vector as a bias term. This allows choosing a random latent variable and so that the resulting output will not bunch up. In some cases, the output of each convolutional layer (e.g., conv 3×3) in the synthesis network is a block of activation maps. In some cases, the upsampling layer doubles the dimensions of input (e.g., from 4×4 to 8×8) and is followed by another convolutional layer(s) (e.g., third convolutional layer).

According to some embodiments, synthesis network 315 adds Gaussian noise to each of the activation maps prior to the AdaIN operations. A different noise sample is generated for each block and is interpreted using learned per-layer scaling factors 325. In some embodiments, the Gaussian noise introduces style-level variation at a given level of detail.

Image Generation

Figure 4:
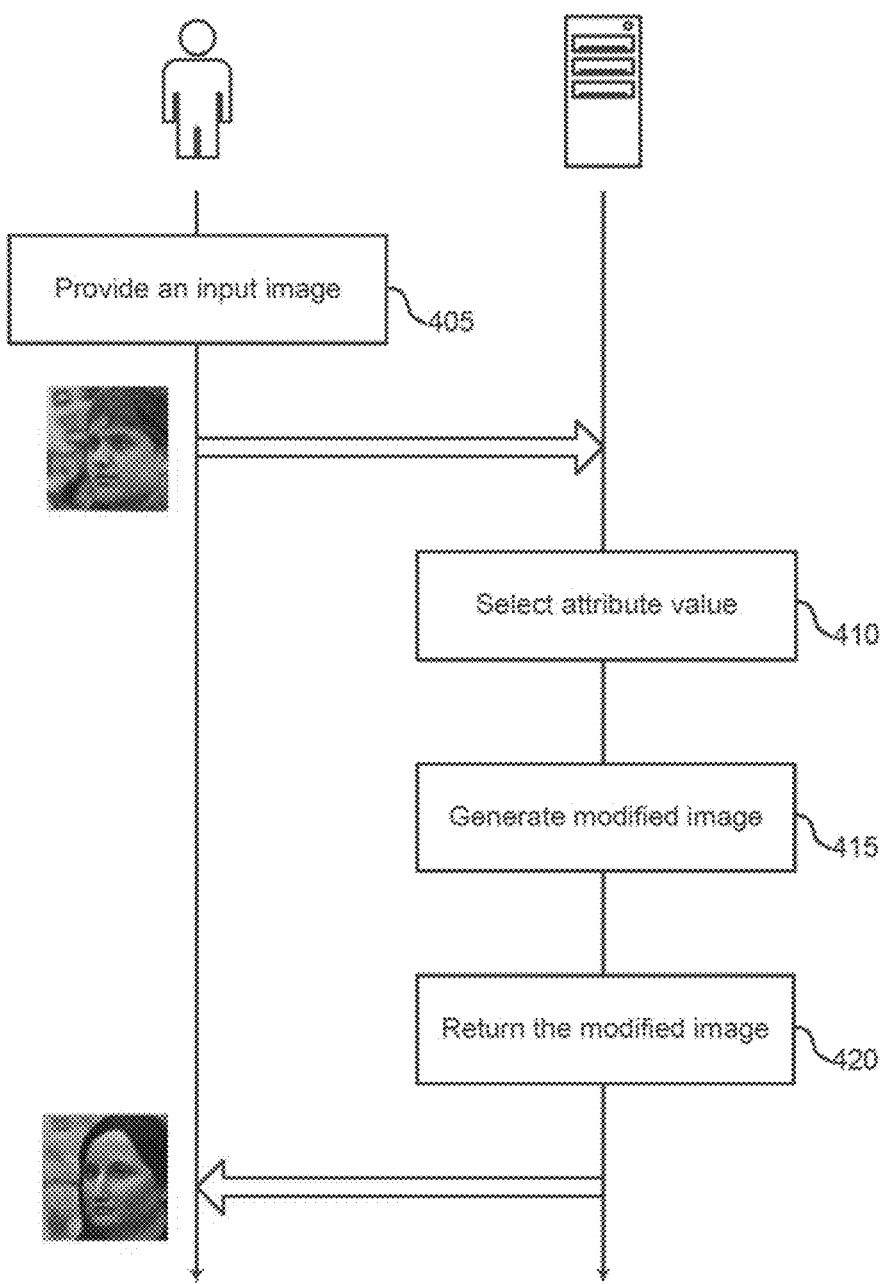
FIG. 4 illustrates a method image generation according to embodiments of the present disclosure.
Figure 5:
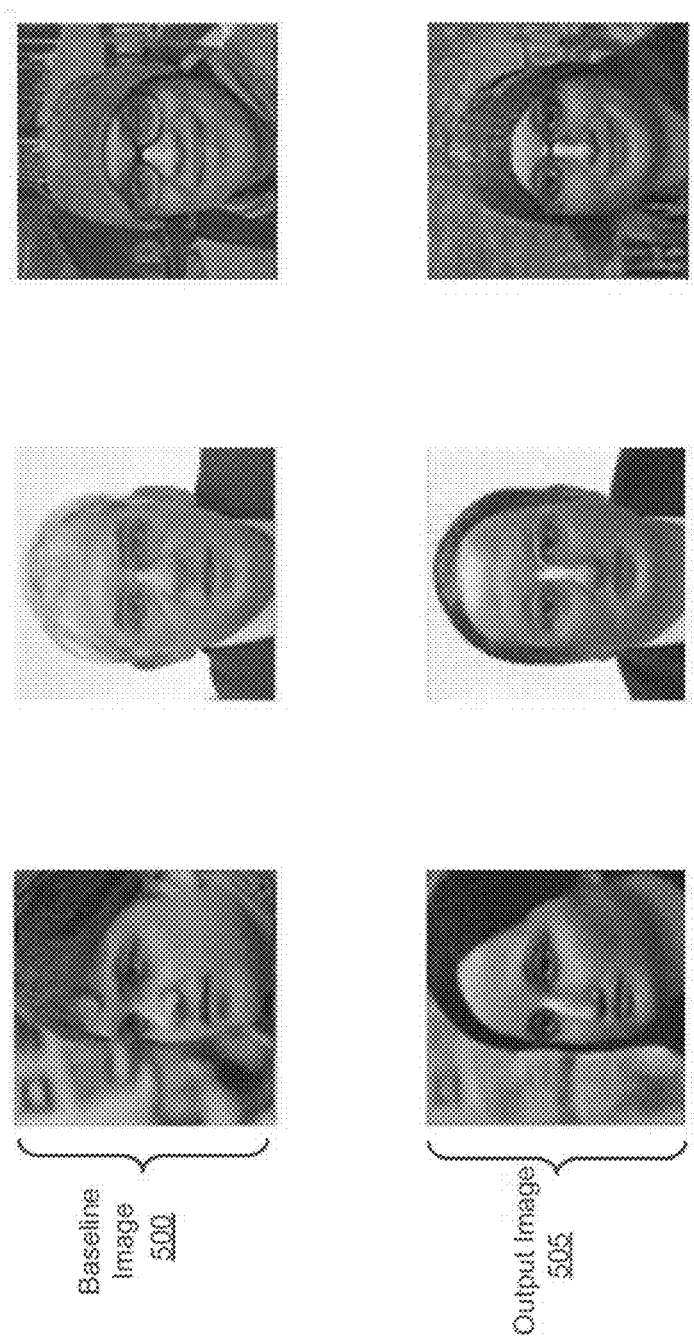
FIG. 5 illustrates an image generation that uses a generative model according to embodiments of the present disclosure.
Figure 6:
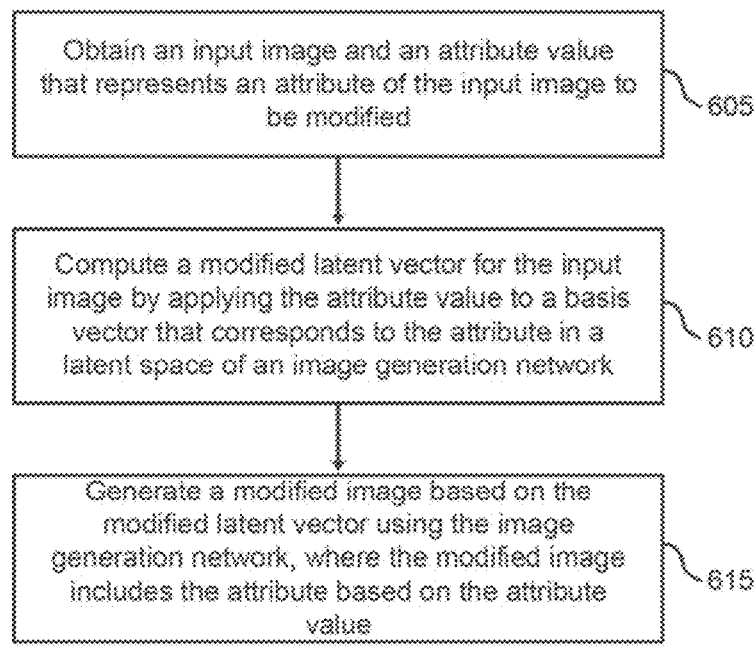
FIG. 6 illustrates a method for image generation according to embodiments of the present disclosure.

FIGS. 4-6 illustrate a method, apparatus, and non-transitory computer readable medium for image generation. One or more embodiments of the method, apparatus, and non-transitory computer readable medium include obtaining an input image and an attribute value representing an attribute of the input image to be modified; computing a modified latent vector for the input image by applying the attribute value to a basis vector that corresponds to the attribute in a latent space of an image generation network; and generating a modified image based on the modified latent vector using the image generation network, wherein the modified image includes the attribute based on the attribute value.

Some embodiments of the method, apparatus, and non-transitory computer readable medium further include receiving a user input via a user interface that includes an attribute control element for the attribute, wherein the user input indicates the attribute value.

Some embodiments of the method, apparatus, and non-transitory computer readable medium further include projecting the input image into the latent space to obtain an input latent vector. Some embodiments further include computing a representation of the input latent vector in an orthogonal basis that includes the basis vector, where the modified latent vector is based on the input latent vector. In some embodiments, the modified image retains a plurality of attributes from the input image other than the attribute.

Some embodiments of the method, apparatus, and non-transitory computer readable medium further include obtaining an additional attribute value representing an additional attribute of the input image to be modified. Some embodiments further include computing an additional latent vector based on the additional attribute value by applying the additional attribute value to an additional basis vector corresponding to the additional attribute in the latent space of the image generation network. Some embodiments further include generating an additional image based on the additional latent vector using the image generation network.

FIG. 4 illustrates a method for image generation according to embodiments of the present disclosure. In some embodiments, these operations are performed by a system that includes a processor that executes a set of codes to control functional elements of an apparatus. Additionally or alternatively, certain processes are performed using special-purpose hardware. In general, these operations are performed according to the methods and processes described in accordance with embodiments of the present disclosure. In some embodiments, the operations described herein are composed of various substeps, or are performed in conjunction with other operations.

At operation 405, the user provides an input image. For example, the input image may be an image of a face, and may be uploaded by a user via a user interface. In some cases, the operations of this step refer to, or may be performed by, a user as described with reference to FIG. 1. In some cases, the operations of this step refer to, or may be performed by, an image generation apparatus as described with reference to FIGS. 1 and 2.

At operation 410, the system selects attribute value. For example, the user may select a value for the attribute "Mona Lisa Style" using a style slider in a user interface of an image editing application. In some cases, the operations of this step refer to, or may be performed by, an image generation apparatus as described with reference to FIGS. 1 and 2.

At operation 415, the system generates modified image. The image may retain the identity of the original image, but may include the selected attribute (i.e., Mona Lisa Style). For example, a GAN model can be used to generate an image based on a modified latent vector. The GAN or other generative model may be trained to encode the attribute in a particular dimension of the latent space. In some cases, the operations of this step refer to, or may be performed by, an image generation apparatus as described with reference to FIGS. 1 and 2.

At operation 420, the system returns the modified image. For example, the input image may be projected into a latent space, and a latent vector representing the selected attribute may be modified based on the attribute value. Then an image generation model may be used to generate the output image based on the modified latent vector.

In some cases, the system can return the modified image to the user via user interface on a user device as described in FIG. 1. In some cases, the operations of this step refer to, or may be performed by, an image generation apparatus as described with reference to FIGS. 1 and 2.

FIG. 5 illustrates image generated using a generative model according to embodiments of the present disclosure. The example shown includes input image 500 and output image 505. Each of the output images 505 may retain the identity of the corresponding input image 500, but may incorporate a selected attribute (i.e., Mona Lisa style).

FIG. 5 illustrates the synthesis of images from a method according to an embodiment, and using an image generation model as the baseline training procedure. The example shown includes input image 500 and output image 505. The output images were generated from the same generator. In some cases the adaptation is from a human face into domain described by a text prompt such as: princess, painting in the style of Edvard Munch, joker, plastic puppet, zombie, neanderthal, Mona Lisa painting, cubism art, Modigliani painting, oil painting, 3D render, werewolf, sketch, elf, etc.

A first aspect is that a method according to an embodiment can effectively generate the target images as seen in the input images 500, a single generator tuned with a method according to an embodiment can generate output images 505 that correspond to multiple text-supervised training models in quality.

The second aspect is preserving the knowledge of the original domain. As seen from the output images 505, the generator keeps generating high-quality facial images. For example, if an original model had a quality score (i.e., a KID score) of 0.51 and a tuned model according to an embodiment obtained 0.52, which is effectively same quality.

FIG. 6 illustrates a method for image generation according to embodiments of the present disclosure. In some embodiments, these operations are performed by a system that includes a processor that executes a set of codes that control functional elements of an apparatus. Additionally or alternatively, certain processes are performed using special-purpose hardware. In general, these operations are performed according to the methods and processes described in accordance with embodiments of the present disclosure. In some embodiments, the operations described herein are composed of various substeps, or are performed in conjunction with other operations.

At operation 605, the system obtains an input image and an attribute value that represents an attribute of the input image to be modified. In some cases, the operations of this step refer to, or may be performed by, a machine learning model as described with reference to FIG. 2.

At operation 610, the system computes a modified latent vector for the input image by applying the attribute value to a basis vector that corresponds to the attribute in a latent space of an image generation network. In some cases, the operations of this step refer to, or may be performed by, an image generation network as described with reference to FIG. 2.

At operation 615, the system generates a modified image based on the modified latent vector using the image generation network, where the modified image includes the attribute based on the attribute value. In some cases, the operations of this step refer to, or may be performed by, an image generation network as described with reference to FIG. 2.

Training FIGS. 7-8, 9A and 9B illustrate a method, apparatus, and non-transitory computer-readable medium for image generation. Given a training image set, a network may learn to generate new image data with similar properties as the training set. For example, a GAN trained on photographs can generate new images that look authentic to a human observer. A zero-shot generative model refers to a setting where images from the novel class are absent in the training set A few shot generative model refers to a setting where a limited set of images from the novel class were introduced in the training set. A many shot generative model refers to a setting where the novel class is represented in the training set. In some examples, a GAN includes a generator network and a discriminator network. The generator network generates candidates while the discriminator network evaluates the generated candidates. The generator network learns to map from a latent space, which is a vector space that represents image features, to output candidate images. While the discriminator network distinguishes the candidate images from the true data distribution i.e., images represented within the GAN's domain. The generator network's training objective can be to increase the error rate of the discriminator network (i.e., to produce novel candidates that the discriminator network classifies as real).

However, training models can be expensive and time-consuming. Therefore, users may employ a method of transfer learning described as "fine-tuning." Fine-tuning refers to holding certain weights in a pre-trained model as fixed while introducing an unseen training set to "fine-tune" the adjustable weights. "Fine-tuning" balances the learning of the pretrained model while extending the model to unseen data sets. However, in the context of GANS, a generator may "forget" how to generate images from the original dataset in the process of fine-tuning.

One or more embodiments of the method, apparatus, and non-transitory computer-readable medium include initializing parameters of an image generation network; identifying a target value for a target attribute; computing an edit latent vector by applying the target value to a basis vector of a latent space of an image generation network; generating an edit output image based on the edit latent vector; computing an edit loss function based on the edit output image; and training the image generation network to depict the target attribute by updating the parameters based on the edit loss function. In some embodiments, the edit loss function is used to train the image generation network to generate images having the target attribute.

Some embodiments of the method, apparatus, and non-transitory computer readable medium further include identifying a baseline latent vector that is independent of the target value. Some embodiments further include generating a baseline output image based on the baseline latent vector. Some embodiments further include computing a baseline loss function based on the baseline output image, wherein the parameters of the image generation network are updated based on the baseline loss function.

Some embodiments of the method, apparatus, and non-transitory computer readable medium further include sampling an initial latent vector from the latent space, wherein the edit latent vector and the baseline latent vector are based on the initial latent vector. In some embodiments, the baseline loss function is used to prevent the image generation network from forgetting a previously trained image generation task.

Some embodiments of the method, apparatus, and non-transitory computer readable medium further include pre-training the image generation network to generate images prior to training the image generation network to depict the target attribute. Some embodiments of the method, apparatus, and non-transitory computer readable medium further include identifying an orthogonal basis for the latent space. Some embodiments further include selecting the basis vector to correspond to the target attribute.

Some embodiments of the method, apparatus, and non-transitory computer readable medium further include sampling a set of latent vectors in the latent space. Some embodiments further include performing a principal component analysis (PCA) based on the set of latent vectors, wherein the orthogonal basis and the basis vector are based on the PCA.

Some embodiments of the method, apparatus, and non-transitory computer readable medium further include identifying an additional target value for an additional target attribute. Some embodiments further include computing an additional edit latent vector by applying the target value to an additional basis vector of the latent space. Some embodiments further include generating an additional edit output image based on the additional edit latent vector. Some embodiments further include computing an additional edit loss function based on the additional edit output image. Some embodiments further include training the image generation network to depict the additional target attribute by updating the parameters based on the additional edit loss function.

Some embodiments of the method, apparatus, and non-transitory computer readable medium further include identifying a plurality of attributes for fine-tuning the image generation network. Some embodiments further include identifying a plurality of basis vectors of the latent space corresponding to the plurality of attributes, respectively. Some embodiments further include training the image generation network to depict each of the plurality of attributes based on values of the plurality of basis vectors, respectively.

Figure 7:
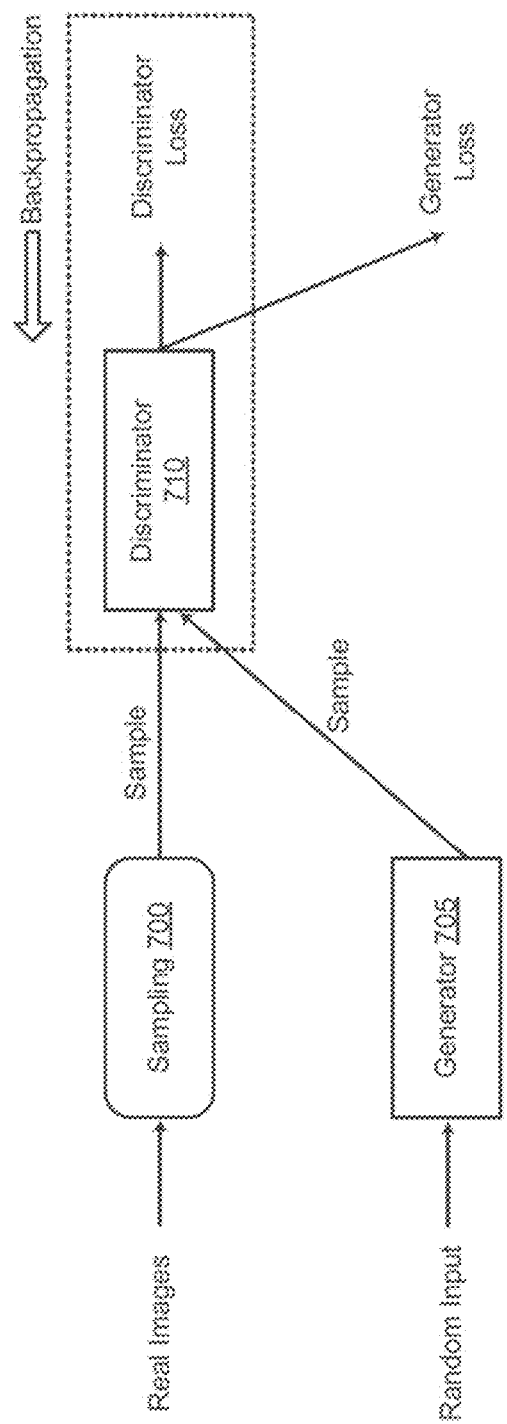
FIG. 7 illustrates a generative adversarial network (GAN) training according to embodiments of the present disclosure.

FIG. 7 illustrates GAN training according to embodiments of the present disclosure. The example shown includes operation 700, generator 705, and discriminator 710.

A generative adversarial network (GAN) has two parts: a generator network and a discriminator network. The generator network generates candidates while the discriminator network evaluates the candidates. The generator network learns to map from a latent space to a data distribution of interest, while the discriminator network distinguishes candidates produced by the generator from the true data distribution. The generator network's training objective is to increase the error rate of the discriminator network, i.e., to produce novel candidates that the discriminator network classifies as real. In training, the generator network generates false data, and the discriminator network learns the false data.

Referring to FIG. 7, at operation 700, sample (e.g., real data) is generated from real images. The sample generated from the real images is the first input to discriminator 710. The discriminator 710 uses the real data as positive examples during training. In some embodiments, the operations of this step refer to, or may be performed by, a training component as described with reference to FIG. 2.

According to some embodiments, generator 705 receives random input and generates a sample (e.g., false data). The sample generated by the generator 705 is the second input to the discriminator 710. The discriminator 710 uses the false data as negative examples during training.

According to some embodiments, in discriminator training, the generator 705 is not trained. Weights of the generator 705 remain constant while the generator 705 generates examples for the discriminator 710. In some embodiments, the discriminator 710 uses generator loss for training. First, the discriminator 710 classifies the real data and the false data generated by the generator 705. Then, the discriminator loss is used to penalize the discriminator 710 for misclassifying the real data as false or the false data as real. Next, the discriminator 710 updates the weights of the discriminator 710 through backpropagation from the discriminator loss through the discriminator 710.

According to some embodiments, GAN training proceeds in alternating periods. For example, the discriminator 710 is trained for one or more epochs and the generator 705 is trained for one or more epochs. The training system continues to train the generator 705 and the discriminator 710 in such a way.

Figure 8:
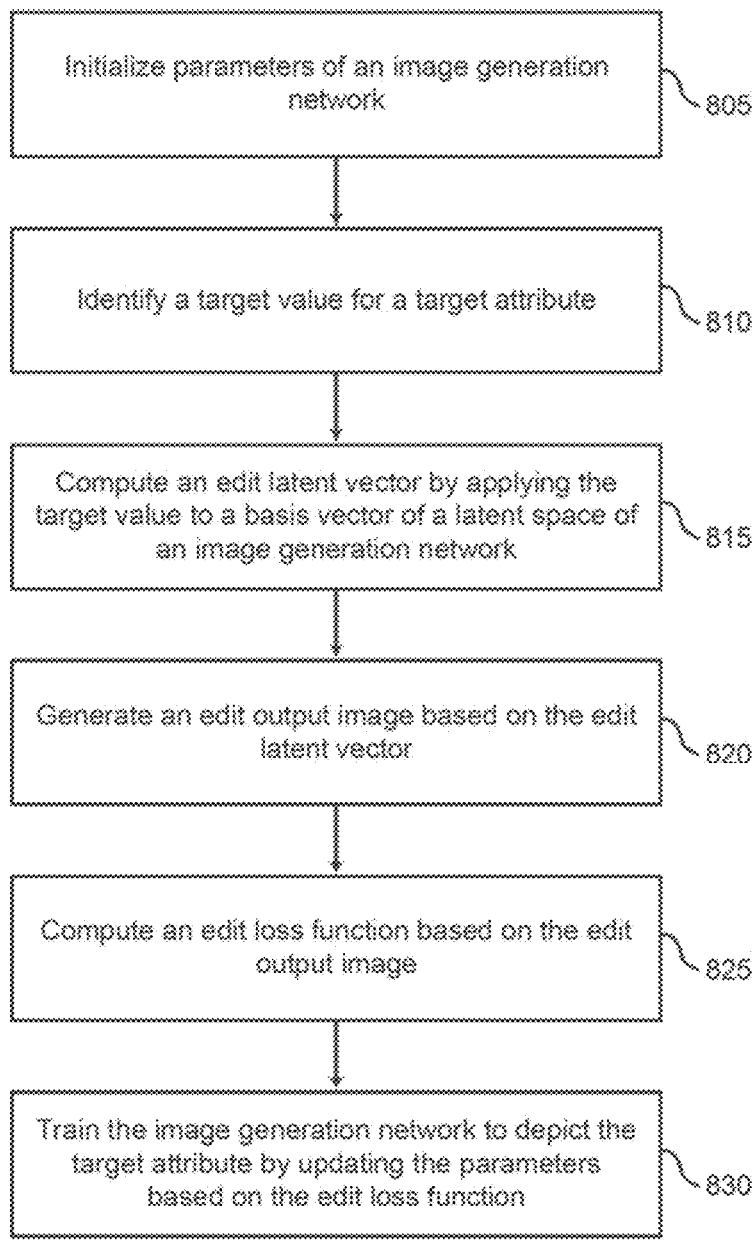
FIG. 8 illustrates a method for image generation according to embodiments of the present disclosure.

FIG. 8 illustrates a method for image generation according to embodiments of the present disclosure. In some embodiments, these operations are performed by a system that includes a processor that executes a set of codes that control functional elements of an apparatus. Additionally or alternatively, certain processes are performed using special-purpose hardware. In general, these operations are performed according to the methods and processes described in accordance with embodiments of the present disclosure. In some embodiments, the operations described herein are composed of various substeps, or are performed in conjunction with other operations.

At operation 805, the system initializes parameters of an image generation network. In some embodiments, the operations of this step refer to, or may be performed by, an image generation network as described with reference to FIG. 2.

At operation 810, the system identifies a target value for a target attribute. In some cases, the operations of this step refer to, or may be performed by, an image generation network as described with reference to FIG. 2.

At operation 815, the system computes an edit latent vector by applying the target value to a basis vector of a latent space of the image generation network. In some embodiments, the operations of this step refer to, or may be performed by, an image generation network as described with reference to FIG. 2.

At operation 820, the system generates an edit output image based on the edit latent vector. In some embodiments, the operations of this step refer to, or may be performed by, an image generation network as described with reference to FIG. 2.

At operation 825, the system computes an edit loss function based on the edit output image. In some embodiments, the operations of this step refer to, or may be performed by, a training component as described with reference to FIG. 2.

At operation 830, the system trains the image generation network to depict the target attribute by updating the parameters based on the edit loss function. In some embodiments, the operations of this step refer to, or may be performed by, a training component as described with reference to FIG. 2.

Figure 9A:
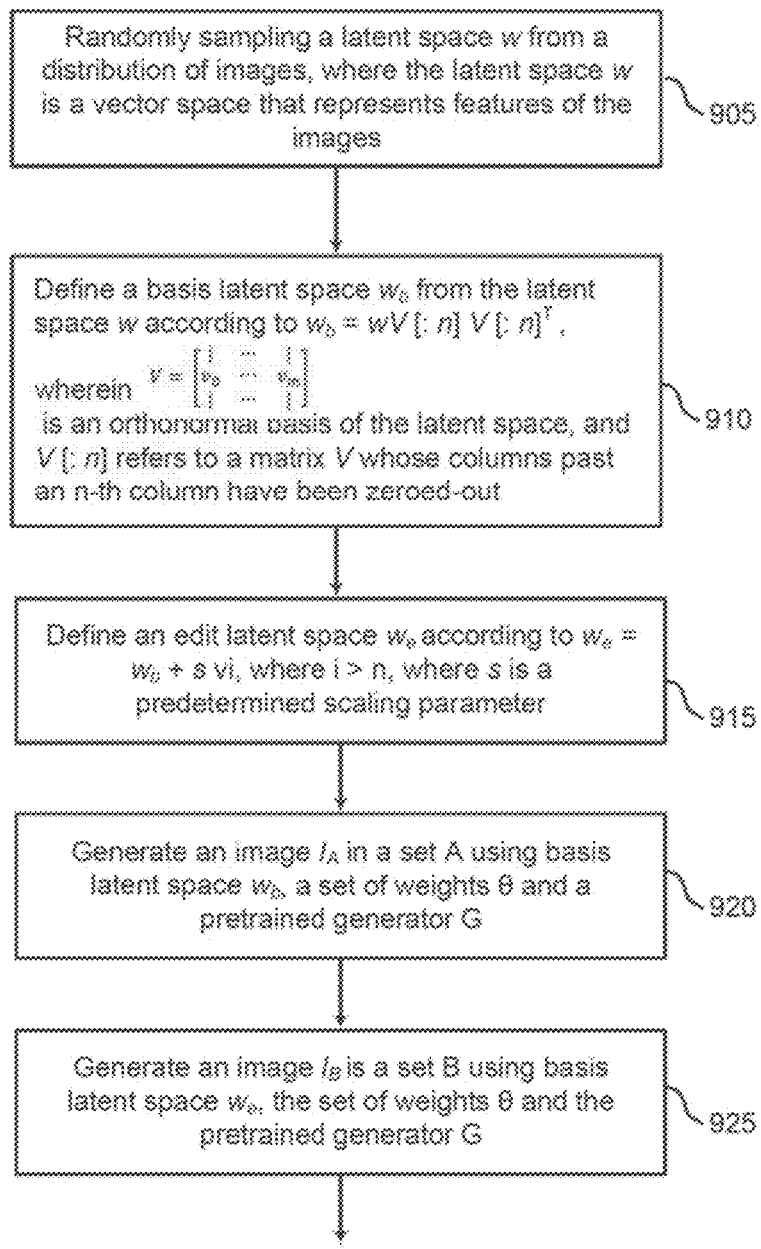
FIGS. 9A and 9B illustrate a method for training a generative model that generates digital images from multiple domains according to embodiments of the present disclosure.
Figure 9B:
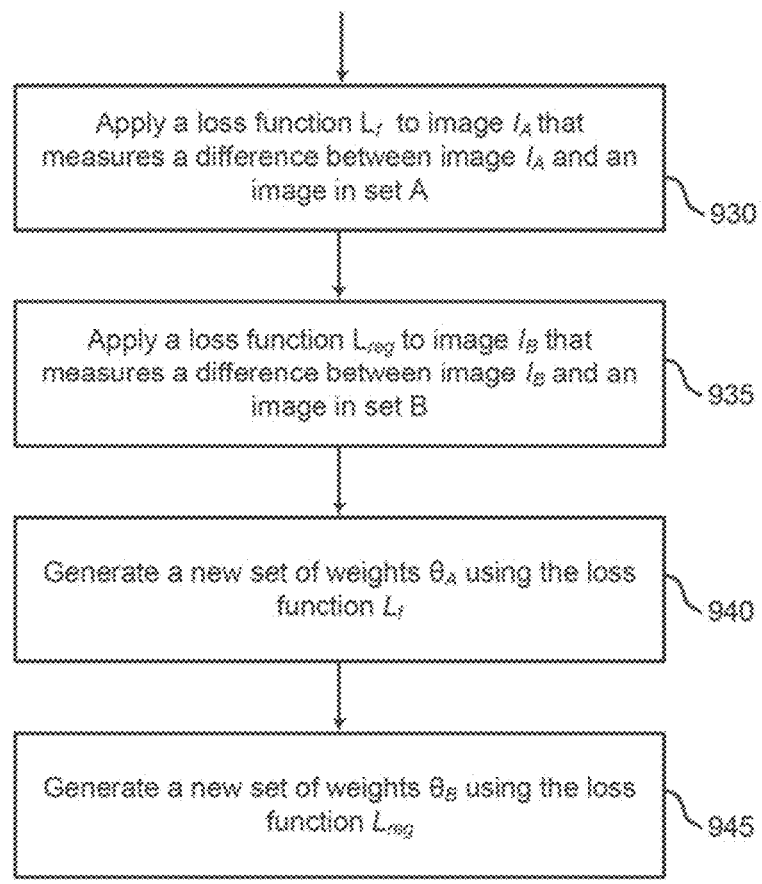

FIGS. 9A and 9B illustrate a method for training a generative model that generates digital images from multiple domains according to embodiments of the present disclosure. The training procedure of FIGS. 9A-9B can generate images that combine features from different sets of images, or generate images to combine text attributes with images.

In some embodiments, these operations are performed by a system that includes a processor that executes a set of codes that control functional elements of an apparatus. Additionally or alternatively, certain processes are performed using special-purpose hardware. In general, these operations are performed according to the methods and processes described in accordance with embodiments of the present disclosure. In some cases, the operations described herein are composed of various substeps, or are performed in conjunction with other operations.

Embodiments are provided with a training procedure, $f$, that tunes a generator G to transform images in domain A to images in domain B. For example, $f(\theta_A, B) = \theta_B$, and $G(\cdot; \theta_A)$, $G(\cdot; \theta_B)$ generate images from domains A, B respectively. For example, domain A may be images of cats, and domain B may be images of tigers. The generator G can be any function or neural network.

Embodiments of the disclosure create a training procedure $f$ that tunes G such the resulting generator can generate images from either domain with the original quality and also from the interpolation between domains. For example, $f'(\theta_A, B) = \theta_{AB}$ and $G(w; \theta_{AB})$ may be an image from A, B or "between" A and B, depending exclusively on the input w. A method according to an embodiment can be extended to a finite arbitrary number of domains, $n-\{B_i\}_{i=0}^{n-1}$. A method according to an embodiment uses an image generation model such as StyleGAN-NADA as the training procedure.

Embodiments of the disclosure include a training procedure $f$ that includes the following steps: (1) Sample latent code w from some space or distribution; (2) Generate image $I=G(w; \theta)$, where w is a latent code and $\theta$ are weight; (3) Apply a loss function, $L_f(I)$, to encourage I to belong to domain B; and (4) Use the loss function $L_f$ to update weights $\theta$, and repeat steps 2 and 3 until convergence. The loss function is a measure of how much the generated image I deviates from an image in domain B. A training procedure $f'$ according to an embodiment starts with a pretrained generator G, but differs slightly, as described below. The generator G has been pretrained to generate images in set A.

At operation 905, the system randomly samples a latent vector w from a latent space that is a vector space that represents features of the images. In an embodiment, the distribution of images may be domain A that is a set of images of cats. In some embodiments, the operations of this step refer to, or may be performed by, a training component as described with reference to FIG. 2.

At operation 910, the system defines a baseline latent vector $w_b$ from the latent space w according to $w_b = wV[:n]V[:n]^T$, where $$V = \begin{bmatrix} | & \cdots & | \\ v_0 & \cdots & v_m \\ | & \cdots & | \end{bmatrix}$$

is an orthonormal basis of the latent space, and V[:n] refers to a matrix V whose columns past an n-th column have been zeroed-out. n is the number of new domains. Each zeroed-out column corresponds to one of the distinct hyperplanes into which the latent space is decomposed, and is trained with a different objective to behave differently from other hyperplanes. The baseline latent vector $w_b$ is associated with the image domain B that should not be forgotten. In some embodiments, the operations of this step refer to, or may be performed by, a training component as described with reference to FIG. 2.

At operation 915, the system defines an edit latent vector $w_e$ according to $w_e = w_b + s\,v_i$, where i>n, where s is a predetermined scaling parameter. In some embodiments, the operations of this step refer to, or may be performed by, a training component as described with reference to FIG. 2.

At operation 920, the system generates an image $I_A$ in a set A using basis latent vector $w_b$, a set of weights $\theta$ and the pretrained generator G. In some embodiments, the operations of this step refer to, or may be performed by, a training component as described with reference to FIG. 2.

At operation 925, the system generates an image $I_B$ in a set B using basis latent vector $w_e$, the set of weights $\theta$ and the pretrained generator G. In an embodiment, set B may be images of tigers. In some embodiments, the operations of this step refer to, or may be performed by, a training component as described with reference to FIG. 2.

At operation 930, the system applies a loss function $L_f$ to image $I_A$ that measures a difference between image $I_A$ and an image in set A. The loss function $L_f$ is inherited from the original training procedure for set A, and outputs a scalar quantity. In some embodiments, the operations of this step refer to, or may be performed by, a training component as described with reference to FIG. 2.

At operation 935, the system applies a loss function $L_{reg}$ to image $I_B$ that measures a difference between image $I_B$ and an image in set B. Loss function $L_{reg}$ outputs a scalar quantity, and is described below. In some embodiments, the operations of this step refer to, or may be performed by, a training component as described with reference to FIG. 2.

At operation 940, the system generates a new set of weights $\theta_A$ using the loss function $L_f$. In some embodiments, the operations of this step refer to, or may be performed by, a training component as described with reference to FIG. 2.

At operation 945, the system generates a new set of weights $\theta_B$ using the loss function $L_{reg}$. In some embodiments, the operations of this step refer to, or may be performed by, a training component as described with reference to FIG. 2.

The operations 920, 930 and 940 are repeated using the weights $\theta_A$ until the loss functions $L_f$ indicates that images $I_A$ have converged to target set A. The operations 925, 935, and 945 are repeated using the weights BB until the loss functions $L_{reg}$ indicate that images $I_B$ have converged to target set B. The training procedure is determined to have converged when a change in the loss function's output between successive iterations falls below a predetermined threshold.

For each separate latent vector $w_e$ and $w_b$, the generator G is trained with different objectives. For $w_e$, the loss function $L_f(I_B)$ is applied at each iteration, assuring that the tuning to domain B is performed. This term assures that the tuning to domain B is performed in some region of the latent space.

For $w_b$, a regularization loss function $L_{reg} - L_{GAN-A} + d(G(w_b; \theta), G(w_b; \theta_A))$ is applied, where d is some distance metric. This loss function prevents G from forgetting the knowledge in A in two complementary ways. The first term is the original task that generator $G(\cdot; \theta_A)$ was trained for, which is a practice to prevent forgetting. The second term minimizes changes in G by penalizing deviations from the outputs generated by the original $G(\cdot, \theta_A)$.

When operating with multiple domains and $\{B_i\}$ training procedures, $\{f_i\}_i$-$f'$ differs in that there exists multiple $\{w_e\}_i$; and a respective $L_{fi}$ (l) is applied on each.

Figure 10:
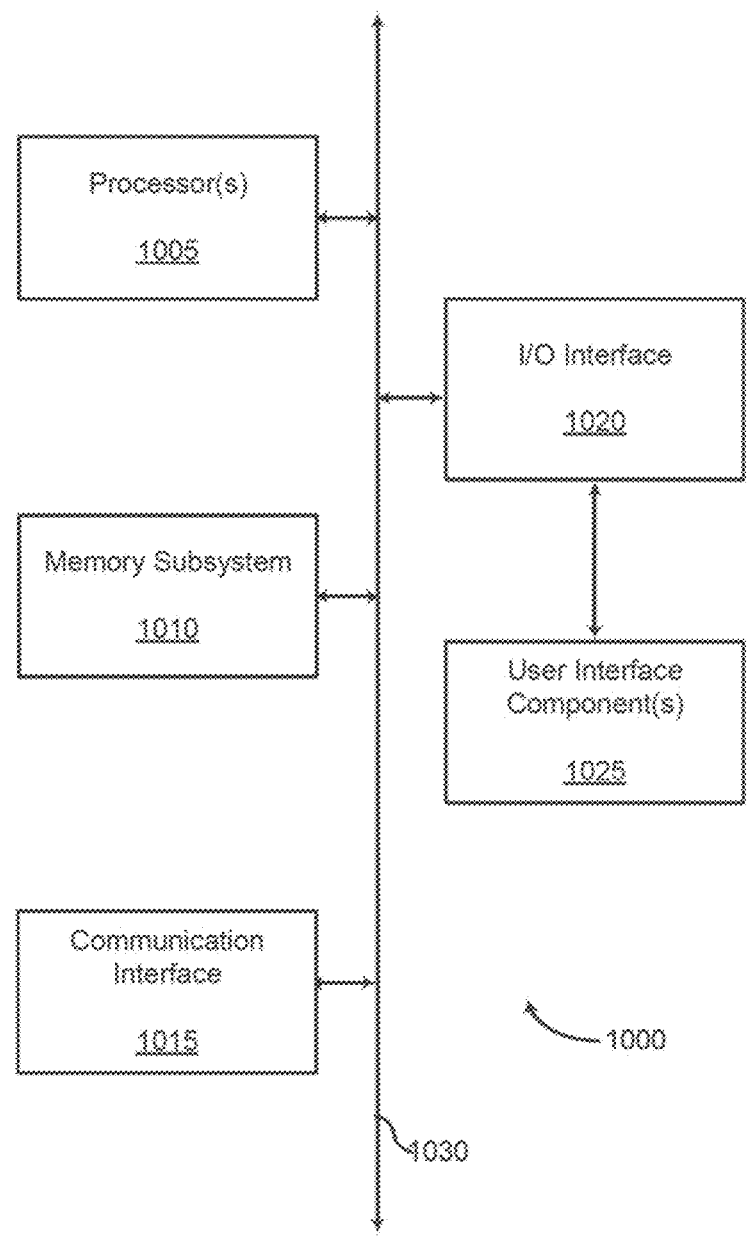
FIG. 10 illustrates a computing device according to embodiments of the present disclosure.

FIG. 10 illustrates a computing device 1000 according to embodiments of the present disclosure. In one embodiment, computing device 1000 includes processor(s) 1005, memory subsystem 1010, communication interface 1015, I/O interface 1020, user interface component(s) 1025, and channel 1030.

In some embodiments, computing device 1000 is an example of, or includes embodiments of, the image generation apparatus as described with reference to FIGS. 1-2. In some embodiments, computing device 1000 includes one or more processors 1005 that can execute instructions stored in memory subsystem 1010 to obtain an input image and an attribute value representing an attribute of the input image; compute a modified latent vector for the input image by applying the attribute value to a basis vector corresponding to the attribute in a latent space of an image generation network; and generate a modified image based on the modified latent vector using the image generation network, wherein the modified image includes the attribute based on the attribute value.

According to some embodiments, computing device 1000 includes one or more processors 1005. In some cases, a processor is an intelligent hardware device, such as a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor operates a memory array using a memory controller. In other cases, a memory controller is integrated into a processor. In some cases, a processor executes computer-readable instructions stored in a memory to perform various functions. In some embodiments, a processor includes special purpose components for modem processing, baseband processing, digital signal processing, or transmission processing. Processor(s) 1005 is an example of, or includes embodiments of, the processor unit as described with reference to FIG. 2.

According to some embodiments, memory subsystem 1010 includes one or more memory devices. Embodiments of a memory device include random access memory (RAM), read-only memory (ROM), or a hard disk. Embodiments of memory devices include solid state memory and a hard disk drive. In some embodiments, memory is used to store computer-readable, computer-executable software that includes instructions that, when executed, cause a processor to perform various functions described herein. In some cases, the memory contains, among other things, a basic input/output system (BIOS) that controls basic hardware or software operations such as the interaction with peripheral components or devices. In some embodiments, a memory controller operates memory cells. For example, the memory controller can include a row decoder, column decoder, or both. In some embodiments, memory cells within a memory store information in the form of a logical state. Memory subsystem 1010 is an example of, or includes embodiments of, the memory unit as described with reference to FIG. 2.

According to some embodiments, communication interface 1015 operates at a boundary between communicating entities, such as computing device 1000, one or more user devices, a cloud, and one or more databases, and channel 1030 and can record and process communications. In some cases, communication interface 1015 enables a processing system coupled to a transceiver, such as a transmitter and/or a receiver. In some embodiments, the transceiver can transmit (or send) and receive signals for a communications device via an antenna.

According to some embodiments, I/O interface 1020 is controlled by an I/O controller that manages input and output signals for computing device 1000. In some embodiments, I/O interface 1020 manages peripherals not integrated into computing device 1000. In some cases, I/O interface 1020 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1020 or via hardware components controlled by the I/O controller.

According to some embodiments, user interface component(s) 1025 enables a user to interact with computing device 1000. In some cases, user interface component(s) 1025 include an audio device, such as an external speaker system, an external display device such as a display screen, an input device, such as a remote-control device interfaced with a user interface directly or through the I/O controller, or a combination thereof. In some cases, user interface component(s) 1025 include a GUI.

The description and drawings described herein represent example configurations and do not represent all the implementations within the scope of the claims. For example, the operations and steps may be rearranged, combined or otherwise modified. In addition, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices, such as a combination of a DSP and a microprocessor, multiple microprocessors, one or more microprocessors in conjunction with a DSP core, or any other such configuration. Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media that include any medium that facilitates transfer of code or data.

A non-transitory storage medium may be any available medium that can be accessed by a computer. For example, non-transitory computer-readable media can include random access memory (RAM), read-only memory (ROM), electrically erasable programmable read-only memory (EEPROM), compact disk (CD) or other optical disk storage, magnetic disk storage, or any other non-transitory medium for carrying or storing data or code.

In addition, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XY or XZ or YZ or XYZ. In addition, the phrase "based on" is not used to represent a closed set of conditions. For example, a step that is described as "based on condition A" may be based on both condition A and condition B. In other words, the phrase "based on" shall be construed to mean "based at least in part on." In addition, the words "a" or "an" indicate "at least one."

What is claimed is:

1. A method for image generation, comprising:
obtaining an input image and an attribute value representing an attribute of the input image to be modified;
selecting a basis vector corresponding to the attribute from a set of orthogonal basis vectors of a latent space of an image generation network;
computing a modified latent vector for the input image by applying the attribute value to the selected basis vector; and
generating a modified image by decoding the modified latent vector using a convolutional layer of the image generation network, wherein the modified image comprises a synthesized image that includes the attribute based on the attribute value.

2. The method of claim 1, further comprising:
receiving a user input via a user interface that includes an attribute control element for the attribute, wherein the user input indicates the attribute value.

3. The method of claim 1, further comprising:
projecting the input image into the latent space to obtain an input latent vector; and
computing a representation of the input latent vector in an orthogonal basis including the basis vector, wherein the modified latent vector is based on the input latent vector.

4. The method of claim 1, wherein:
the modified image retains a plurality of attributes from the input image other than the attribute.

5. The method of claim 1, further comprising:
obtaining an additional attribute value representing an additional attribute of the input image to be modified;
computing an additional latent vector based on the additional attribute value by applying the additional attribute value to an additional basis vector corresponding to the additional attribute in the latent space of the image generation network; and
generating an additional image based on the additional latent vector using the image generation network.

6. An apparatus for image generation, comprising:
one or more processors; and
one or more memories including instructions executable by the one or more processors to:
obtain an input image and an attribute value representing an attribute of the input image;
select a basis vector corresponding to the attribute from a set of orthogonal basis vectors of a latent space of an image generation network;
compute a modified latent vector for the input image by applying the attribute value to the selected basis vector; and
generate a modified image by decoding the modified latent vector using a convolutional layer of the image generation network, wherein the modified image comprises a synthesized image that includes the attribute based on the attribute value.

7. The apparatus of claim 6, wherein:
the image generation network comprises a generative adversarial network (GAN).

8. The apparatus of claim 6, wherein the instructions are further executable to:
train the image generation network to depict the attribute based on an edit loss function and a baseline loss function.

9. A non-transitory computer readable medium storing code for image generation, the code comprising instructions executable by at least one processor to:
obtain an input image and an attribute value representing an attribute of the input image to be modified;
select a basis vector corresponding to the attribute from a set of orthogonal basis vectors of a latent space of an image generation network;
compute a modified latent vector for the input image by applying the attribute value to the selected basis vector; and
generate a modified image by decoding the modified latent vector using a convolutional layer of the image generation network, wherein the modified image comprises a synthesized image that includes the attribute based on the attribute value.

10. The non-transitory computer readable medium of claim 9, the code further comprising instructions executable by at least one processor to:
receive a user input via a user interface that includes an attribute control element for the attribute, wherein the user input indicates the attribute value.

11. The non-transitory computer readable medium of claim 9, the code further comprising instructions executable by at least one processor to:
project the input image into the latent space to obtain an input latent vector; and
compute a representation of the input latent vector in an orthogonal basis including the basis vector, wherein the modified latent vector is based on the input latent vector.

12. The non-transitory computer readable medium of claim 9, the code further comprising instructions executable by at least one processor to:
obtain an additional attribute value representing an additional attribute of the input image to be modified;

compute an additional latent vector based on the additional attribute value by applying the additional attribute value to an additional basis vector corresponding to the additional attribute in the latent space of the image generation network; and
generate an additional image based on the additional latent vector using the image generation network.

* * * * *